No. 848,257. PATENTED MAR. 26, 1907.
A. MÄDLER, V. HARTUNG & W. GRIESING.
SNAP HOOK.
APPLICATION FILED NOV. 20, 1905.
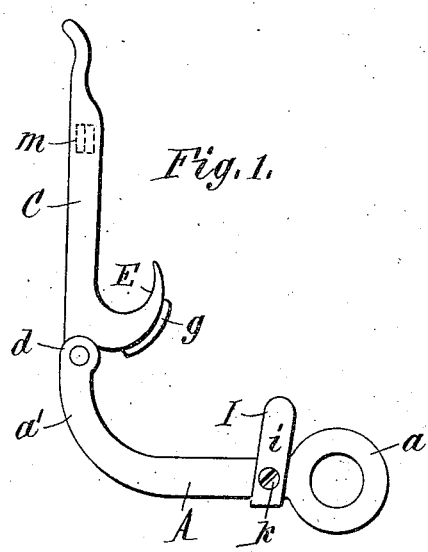
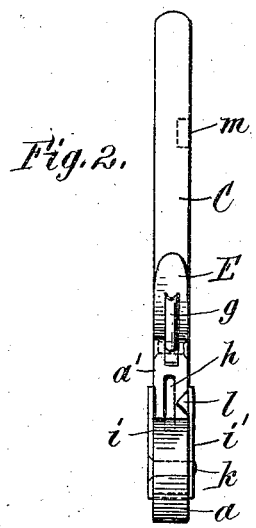
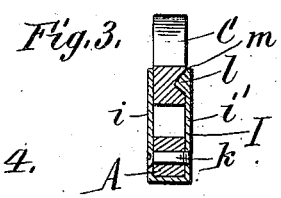
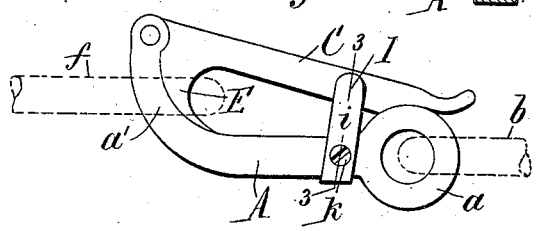
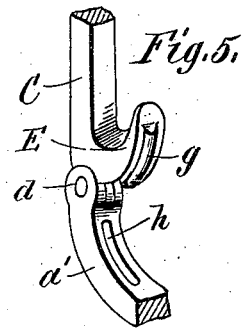
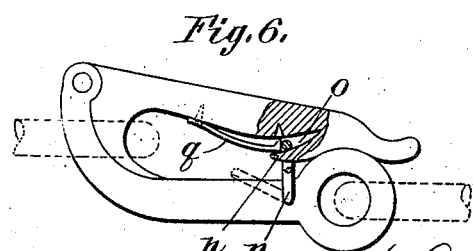
Witnesses:—
R. W. Rumser.
E. A. Vock.
Inventors,
Arno Mädler,
Valentine Hartung, and
Wilhelm Griesing
By Wilhelm, Parker & Hard, Attorneys.

UNITED STATES PATENT OFFICE.

ARNO MÄDLER, VALENTIN HARTUNG, AND WILHELM GRIESING, OF CASSEL, GERMANY.

SNAP-HOOK.

No. 848,257.  Specification of Letters Patent.  Patented March 26, 1907.

Application filed November 20, 1905. Serial No. 288,144.

*To all whom it may concern:*

Be it known that we, ARNO MÄDLER, VALENTIN HARTUNG, and WILHELM GRIESING, subjects of the German Emperor, residing at Cassel, Germany, have invented a new and useful Improvement in Snap-Hooks, of which the following is a specification.

This invention relates to that class of snap-hooks which are provided with a pivoted mousing or member which can be arranged either in such a position that the mouth of the hook is wide open, whereby the engagement and disengagement of the hook is greatly facilitated, or in such a position that the mousing closes the mouth of the hook after the engagement of the hook with the ring, loop, or other draft device has been effected, the construction of the pivoted mousing being such that the draft on the hook tends to hold the mousing closed.

The object of this invention is to construct the hook and mousing in such manner that the engagement and disengagement of the hook is greatly facilitated and to provide the hook with an effective and convenient catch which detachably connects the shank of the hook with the free end of the mousing and assists in holding the latter in a closed position.

In the accompanying drawings, Figure 1 is a side elevation of the preferred embodiment of the invention, showing the mousing open. Fig. 2 is an elevation at right angles to Fig. 1. Fig. 3 is a vertical section in line 3 3, Fig. 4. Fig. 4 is a side elevation showing the mousing closed. Fig. 5 is a fragmentary perspective view of the hinged parts of the hook and mousing. Fig. 6 is a side elevation showing a modified embodiment of the invention.

Like letters of reference refer to like parts in the several figures.

A represents the body or shank of the hook, having at one end an eye $a$ for attachment to a ring or loop $b$, which is shown in dotted lines and which may be part of a chain, trace, or other draft device. The bill end $a'$ of the hook is curved upwardly for connection with the mousing C, which latter is connected to the bill end of the hook by a hinge-joint $d$. The mousing is provided adjacent to the hinge-joint with a curved bearing piece or extension E, which rests when the mousing is closed, Fig. 4, against the inner or concave side of the bill end $a'$ of the hook and receives the part $f$, (shown in dotted lines,) with which the hook is detachably engaged and which may be the cockeye of a whiffletree or some other draft ring, loop, or staple. The convex side of the curved bearing-piece E is preferably provided with a longitudinal curved rib $g$, which when the mousing is closed is seated snugly in a correspondingly-shaped recess $h$, formed in the inner or concave side of the bill end $a'$ of the hook, Fig. 5, thereby assisting in alining the mousing with the hook and preventing one part from twisting with reference to the other under strain. The draft acting upon the curved bearing-piece E tends to hold the mousing closed, and the latter is preferably so constructed that its free end rests in the closed position against the attaching-eye $a$ of the hook.

I represents a spring-catch which is attached to the shank of the hook and engages with its free end the free end portion of the mousing. This spring-catch in its preferred form (shown in Figs. 1–4) consists of a two-armed spring which straddles the shank of the hook and projects with its arms $i$ $i'$ above the same, so as to bear against opposite sides of the free end portion of the mousing when the latter is closed. The spring-catch is secured to the shank of the hook by any suitable means—for instance, by a screw $k$. One of the arms of the spring-catch is provided with a tapering or beveled locking lug or projection $l$, which is forced into a corresponding locking-recess $m$ in the side of the mousing by the spring action upon closing the mousing. The spring-catch holds the mousing yieldingly in the closed position, but allows the mousing to be swung open by applying sufficient force to the free end thereof. The bill end $a'$ of the hook stands at its extreme end approximately at right angles to the shank of the hook, and the mousing when open, as shown in Fig. 1, forms a continuation of the bill end at right angles to the shank. In this position of the mousing the mouth of the hook is wide open, and the hook can be readily passed through a cockeye or other part $f$ for engaging the hook therewith or disengaging the hook therefrom. This is particularly advantageous when the hook is used for connecting a trace to the cockeye on a whiffletree, because it enables the trace to be readily detached from the cockeye if a horse has fallen.

In the modified construction (represented in Fig. 6) the catch for connecting the shank of the hook with the free end of the mousing comprises a bail, loop, or ring n, which is pivotally attached to the shank of the hook near the attaching-eye and engages in a locking-recess o in the mousing over a tongue p, formed on the under side of the mousing and projecting toward the bill of the hook. A locking-spring q is attached to the under side of the mousing and projects with its head or free end into the locking-recess over the end of the tongue, so as to hold the bail n on the tongue. Upon pressing the locking-spring away from the connecting bail or ring n the latter can be released from the tongue and the mousing can be opened.

We claim as our invention—

1. The combination of a hook, a mousing pivoted thereto and having a locking-recess, a catch attached to the shank of the hook and engaging in said recess when the mousing is closed, and means for holding said catch in engagement with said recess, substantially as set forth.

2. The combination of a hook, a mousing pivoted thereto, and a spring-catch which is rigidly secured to the shank of the hook and projects therefrom toward the mousing, said catch being adapted to yield laterally in closing the mousing and to engage the free end thereof when the mousing is closed, substantially as set forth.

3. The combination of a hook, a mousing pivoted thereto, and a spring-catch secured to the shank of the hook and comprising arms which project beyond the shank of the hook and bear against opposite sides of the mousing when the latter is closed, substantially as set forth.

4. The combination of a hook, a mousing pivoted thereto and having a locking-recess in its side, and a spring-catch which is secured to the shank of the hook and projects toward the mousing and which is provided with a locking-lug which engages in the recess of the mousing when the latter is closed, substantially as set forth.

5. The combination of a hook having a curved bill end which is provided in its concave side with a longitudinal recess, and a mousing pivoted to the bill end of the hook and having a curved bearing-piece adapted to bear with its convex side against the concave side of the hook and provided on its convex side with a longitudinal rib which is seated in said recess when the mousing is closed, substantially as set forth.

Witness our hands this 28th day of October, 1905.

ARNO MÄDLER.
VALENTIN HARTUNG.
WILHELM GRIESING.

Witnesses:
HEINRICH HELLWIG,
R. RAFFLAER.